United States Patent
Reifinger et al.

(10) Patent No.: US 10,723,341 B2
(45) Date of Patent: Jul. 28, 2020

(54) AIR DRYER CARTRIDGE

(71) Applicant: KNORR-BREMSE Systeme fuer Nutzfahrzeuge GmbH, Munich (DE)

(72) Inventors: Guenther Reifinger, Germering (DE); Andreas Ochsenkuehn, Munich (DE); Stefan Schaebel, Munich (DE); Andreas Leinung, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 105 days.

(21) Appl. No.: 16/011,323

(22) Filed: Jun. 18, 2018

(65) Prior Publication Data

US 2018/0297572 A1 Oct. 18, 2018

Related U.S. Application Data

(63) Continuation of application No. PCT/EP2016/081216, filed on Dec. 15, 2016.

(30) Foreign Application Priority Data

Dec. 18, 2015 (DE) .......................... 10 2015 122 168

(51) Int. Cl.
 *B60T 17/00* (2006.01)
 *B01D 53/04* (2006.01)
 *B01D 53/26* (2006.01)

(52) U.S. Cl.
 CPC ........ *B60T 17/004* (2013.01); *B01D 53/0415* (2013.01); *B01D 53/261* (2013.01); *B60T 17/002* (2013.01); *B01D 2259/455* (2013.01)

(58) Field of Classification Search
 CPC . B60T 17/004; B60T 17/002; B01D 53/0415; B01D 53/261; B01D 2259/455

(Continued)

(56) References Cited

U.S. PATENT DOCUMENTS 5,595,588 A * 1/1997 Blevins .............. B01D 53/0415
 96/108
5,983,516 A * 11/1999 Trapp ................. B01D 53/0454
 137/112

(Continued)

FOREIGN PATENT DOCUMENTS

CN 1590764 A 3/2005
CN 1747865 A 3/2006

(Continued)

OTHER PUBLICATIONS

German-language Office Action issued in counterpart German Application No. 10 2015 122 168.3 dated Aug. 18, 2016 (eight pages).

(Continued)

*Primary Examiner* — Stephen M Gravini
(74) *Attorney, Agent, or Firm* — Crowell & Moring LLP

(57) ABSTRACT

An air dryer cartridge, in particular for a compressed air treatment system of a commercial vehicle, includes a cartridge housing having a closed housing cover, an inner housing arranged in the cartridge housing, a desiccant accommodated in a space between the cartridge housing and the inner housing, a filter arrangement arranged inside the cartridge housing and positioned in the compressed air stream upstream of the desiccant in relation to normal operation of the air dryer cartridge, and a bypass for bypassing the filter device. A non-return valve, which blocks a compressed air stream in the direction towards the desiccant and allows a compressed air stream in the direction away from the desiccant, is arranged in the bypass. The non-return valve is formed in one piece together with the inner housing.

11 Claims, 2 Drawing Sheets

(58) Field of Classification Search
USPC .......................................................... 34/72
See application file for complete search history.

(56) References Cited

U.S. PATENT DOCUMENTS

| | | | | |
|---|---|---|---|---|
| 6,094,836 | A * | 8/2000 | Mahoney | B01D 53/0415 34/80 |
| 6,484,413 | B1 * | 11/2002 | Larsson | B01D 53/0415 34/73 |
| 6,581,297 | B1 * | 6/2003 | Ginder | B01D 53/261 34/79 |
| 6,785,980 | B1 | 9/2004 | Koelzer | |
| 6,951,581 | B2 * | 10/2005 | Fornof | B01D 46/003 55/417 |
| 7,097,696 | B2 * | 8/2006 | Salzman | B01D 45/08 55/527 |
| 7,100,305 | B2 * | 9/2006 | Hoffman | B01D 53/261 285/62 |
| 7,625,437 | B2 * | 12/2009 | Heer | B01D 53/0415 55/309 |
| 7,846,242 | B2 * | 12/2010 | Paling | B60T 17/004 96/134 |
| 9,375,679 | B2 * | 6/2016 | Adams | B01D 53/261 |
| 2004/0154187 | A1 | 8/2004 | Hoffman et al. | |
| 2006/0123743 | A1 | 6/2006 | Heer | |
| 2007/0144350 | A1 | 6/2007 | Paling | |
| 2012/0118157 | A1 | 5/2012 | Eidenschink et al. | |
| 2013/0206003 | A1 | 8/2013 | Hilberer | |
| 2013/0239815 | A1 | 9/2013 | Niemeyer et al. | |
| 2014/0014201 | A1 | 1/2014 | Minato | |
| 2018/0297572 | A1 * | 10/2018 | Reifinger | B01D 53/0415 |

FOREIGN PATENT DOCUMENTS

| | | | | |
|---|---|---|---|---|
| CN | 103861433 A | 6/2014 | | |
| CN | 105032134 A | 11/2015 | | |
| DE | 10 2005 039 059 B3 | 9/2006 | | |
| DE | 10 2006 019 865 B3 | 8/2007 | | |
| DE | 10 2009 030 897 A1 | 1/2011 | | |
| DE | 10 2010 010 882 A1 | 9/2011 | | |
| DE | 10 2010 011 956 A1 | 9/2011 | | |
| DE | 102015122168 A1 * | 6/2017 | ......... | B01D 53/0415 |
| EP | 1 669 125 A1 | 6/2006 | | |
| EP | 2 377 597 A1 | 10/2011 | | |
| EP | 2 192 971 B1 | 6/2014 | | |
| WO | WO 99/21641 A1 | 5/1999 | | |
| WO | WO 2004/011125 A2 | 2/2004 | | |
| WO | WO-2004103509 A8 * | 5/2005 | ........... | B01D 53/261 |
| WO | WO 2006/048640 A1 | 5/2006 | | |
| WO | WO 2009/043427 A1 | 4/2009 | | |
| WO | WO 2012/132859 A1 | 10/2012 | | |
| WO | WO-2017102960 A1 * | 6/2017 | ........... | B01D 53/261 |

OTHER PUBLICATIONS

International Search Report (PCT/ISA/210) issued in PCT Application No. PCT/EP2016/081216 dated Mar. 23, 2017 with English translation (six (6) pages).

German-language Written Opinion (PCT/ISA/237) issued in PCT Application No. PCT/EP2016/081216 dated Mar. 23, 2017 (six (6) pages).

Chinese-language Office Action issued in Chinese Application No. 201680082095.3 dated Mar. 30, 2020 with English translation (13 pages).

* cited by examiner

AIR DRYER CARTRIDGE

CROSS REFERENCE TO RELATED APPLICATIONS

This application is a continuation of PCT International Application No. PCT/EP2016/081216, filed Dec. 15, 2016, which claims priority under 35 U.S.C. § 119 from German Patent Application No. 10 2015 122 168.3, filed Dec. 18, 2015, the entire disclosures of which are herein expressly incorporated by reference.

BACKGROUND AND SUMMARY OF THE INVENTION

The present invention relates to an air dryer cartridge, in particular for a compressed air treatment system of commercial vehicles.

Air dryer cartridges of this type are used, for example, in commercial vehicles, such as trucks and tractors. These frequently have one or more compressed air consumers, such as, for example, brake systems or pneumatic suspension systems, which have to be supplied with compressed air. The compressed air is typically provided by a compressor, for example a reciprocating piston compressor driven by a drive engine of the vehicle. In order to ensure fault-free operation of the compressed air consumers, the compressed air provided by the compressor customarily has to be treated further. In the compressed air treatment systems provided for this purpose, the compressed air is cleaned of dirt particles which were already contained in the sucked-up air, and also of oil and soot particles which are admitted into the compressed air during the compression process by the compressor, and moisture present in the compressed air is separated off. For this purpose, the compressed air treatment systems of commercial vehicles generally have air dryer cartridges which can dehumidify the compressed air and can preferably also absorb oil and dirt particles.

Conventional air dryer cartridges have a cartridge housing with a closed housing cover, an inner housing arranged in the cartridge housing, a drying agent which is accommodated in an intermediate space between the cartridge housing and the inner housing, and a filter device, which is arranged within the cartridge housing, for cleaning the compressed air. During the normal operation of the air dryer cartridge, the compressed air first of all flows through the filter device before entering the drying agent. For the regeneration mode of the air dryer cartridge, in which the flow passes through the air dryer cartridge in the reverse direction, a bypass for bypassing the filter device is generally provided and a nonreturn valve is arranged in said bypass. Such an air dryer cartridge is disclosed, for example, in WO 2004/011125 A2. In said known air dryer cartridge, the nonreturn valve is fitted on a coalescence filter parallel thereto.

The invention is based on the object of providing an improved air dryer cartridge with a simple design.

This object is achieved by an air dryer cartridge in accordance with embodiments of the invention. Advantageous refinements of the invention are described and claimed herein.

The air dryer cartridge according to the invention has a cartridge housing with a closed housing cover; an inner housing arranged in the cartridge housing; a drying agent which is accommodated in an intermediate space between the cartridge housing and the inner housing; a filter device which is arranged within the cartridge housing and is positioned upstream of the drying agent in the compressed air flow, based on a normal operation of the air dryer cartridge; a bypass for bypassing the filter device; and a nonreturn valve which is arranged in the bypass, is formed integrally with the inner housing and blocks a compressed air flow in the direction of the drying agent and permits a compressed air flow in the direction from the drying agent.

According to the invention, it is proposed to form the nonreturn valve integrally with the inner housing. By means of this measure, the number of individual components can be reduced and the design and assembly of the air dryer cartridge can be simplified.

In an advantageous refinement of the invention, the inner housing and/or the nonreturn valve are/is manufactured from a plastics material. In this refinement, the nonreturn valve can preferably be injection molded onto the inner housing, or inner housing and nonreturn valve can be produced by a two-component injection molding process. The inner housing and the nonreturn valve can preferably be manufactured from the same plastics material or from different plastics materials. In this connection, the term plastics material is basically intended to include all types of plastics, in particular also elastomers with regard to the nonreturn valve. In addition, in this connection, the term plastics material is intended to include materials made from one material and also materials made from two or more different materials.

In an advantageous refinement of the invention, the nonreturn valve has a valve flap which is integrally formed on the inner housing. The valve function of the nonreturn valve can preferably be achieved by a shaping and/or choice of material of the valve flap and/or a shaping of the connection between valve flap and inner housing.

In an advantageous refinement of the invention, compressed air can flow through the nonreturn valve in a direction substantially parallel to a longitudinal axis of the air dryer cartridge, i.e. substantially axially.

In this refinement, the nonreturn valve can preferably have a valve flap with a free end which is supported on an inner circumferential surface of the cartridge housing, preferably on a portion of the inner circumferential surface of the cartridge housing, which portion runs substantially parallel to the longitudinal axis of the air dryer cartridge.

In another advantageous refinement of the invention, compressed air can flow through the nonreturn valve in a direction substantially transversely with respect to a longitudinal axis of the air dryer cartridge, i.e. substantially radially. In this refinement, the nonreturn valve can be positioned further inward in the cartridge housing and is thus, for example, better protected against external mechanical loads on the cartridge housing. In addition, in this refinement, a space region within the cartridge housing, which space region lies in the radial direction outside the nonreturn valve, can preferably be at least partially used for accommodating the drying agent.

In this refinement, the nonreturn valve can preferably have a valve flap with a free end which is supported on a flange inner surface of the fastening flange, said flange inner surface facing the inner housing.

In a further advantageous refinement of the invention, the filter device is arranged substantially coaxially with respect to the longitudinal axis of the air dryer cartridge. In this refinement, compressed air flows through the filter device preferably in the radial direction transversely with respect to the longitudinal axis of the air dryer cartridge. In addition, in this refinement, a space region within the cartridge housing, said space region lying in the radial direction outside the filter device, can preferably be at least partially used for accommodating the drying agent. In this case, the filter device is configured, for example, as a coalescence filter or oil filter.

In another advantageous refinement of the invention, the filter device is oriented substantially transversely with respect to the longitudinal axis of the air dryer cartridge. In this refinement, compressed air flows through the filter device preferably in the axial direction parallel to the longitudinal axis of the air dryer cartridge. The filter device in this case is configured, for example, as a coarse filter.

The inner housing preferably has a first inner housing part and a second inner housing part. The first inner housing part is preferably arranged radially outside the second inner housing part, and the second inner housing part is movable relative to the first inner housing part in the axial direction parallel to the longitudinal axis of the air dryer cartridge. In this refinement, a pretensioning element is preferably provided which presses the second inner housing part in the direction of the housing cover of the air dryer cartridge in order to compress the drying agent.

In yet another advantageous refinement of the invention, the air dryer cartridge has a fastening flange for closing an open end side of the cartridge housing, said end side facing away from the housing cover, and for fastening the air dryer cartridge to a compressed air treatment device. In this refinement, the inner housing is preferably sealed off from the fastening flange via a sealing lip. Said sealing lip is preferably manufactured from a plastics material. In this connection, the term plastics material is intended basically to include all types of plastics, in particular even elastomers. In addition, in this connection, the term plastics material is intended to include materials made from one material and also materials made from two or more different materials. The sealing lip can be manufactured from the same or from a different plastics material than the nonreturn valve.

The present invention is advantageously suitable in particular for use in compressed air treatment systems of a commercial vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
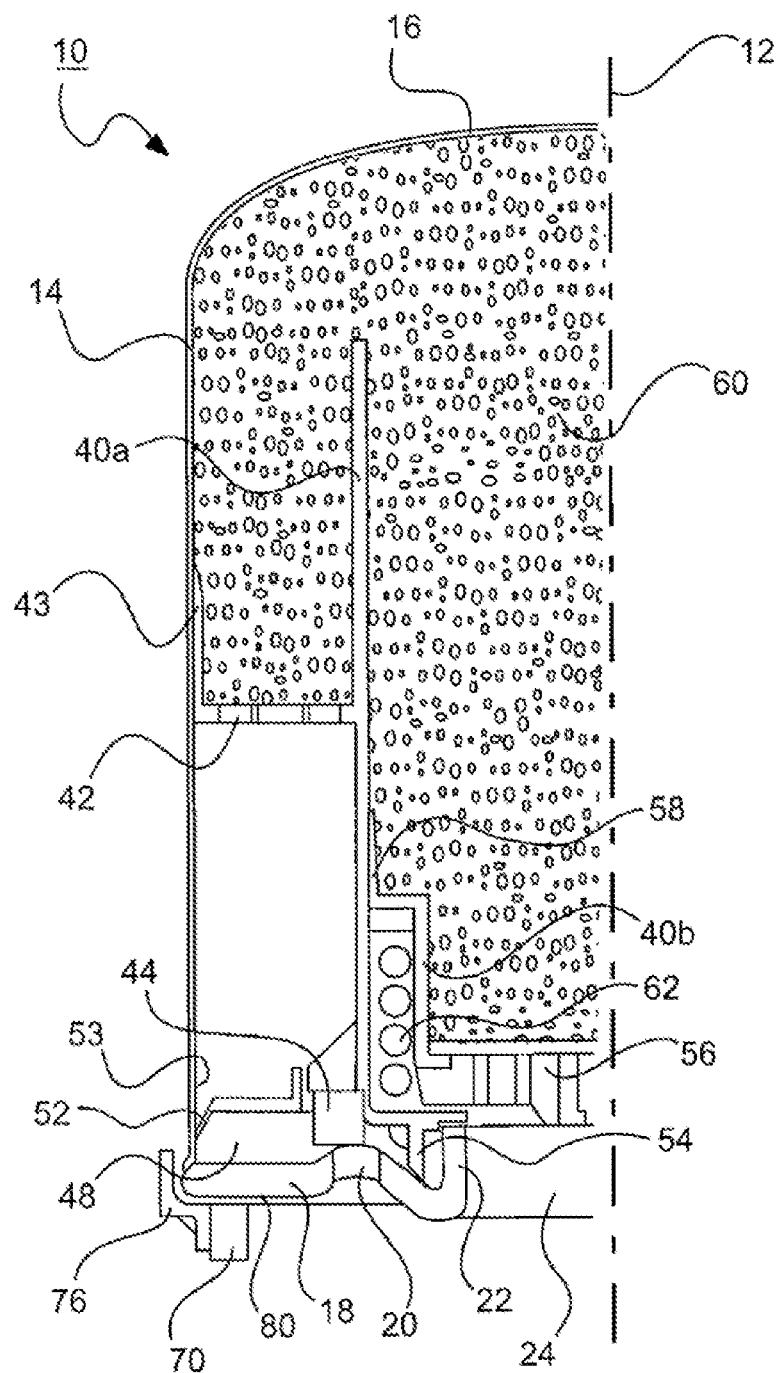
FIG. 1 is a partial sectional view of an air dryer cartridge according to a first exemplary embodiment of the invention.

FIG. 1 shows the design of an air dryer cartridge according to a first exemplary embodiment, which can be mounted on a compressed air treatment device of a compressed air treatment system.

The air dryer cartridge 10 is formed substantially rotationally symmetrically with respect to a longitudinal axis 12 and has a substantially cylindrical or cup-shaped cartridge housing 14 with a closed housing cover 16 which is configured in the form of a deep-drawn metal sheet. The open end side of the cartridge housing 14, which end side faces away from the housing cover 16, is closed with a fastening flange 18 (preferably made from metal). The fastening flange 18 is connected fixedly and fluidtightly to the cartridge housing 14, for example with the assistance of an encircling support ring 76.

The fastening flange 18 has an inlet opening 20, for example in the shape of a circular ring, and a, for example, circular central outlet opening 24. The outlet opening 24 is arranged within the inlet opening 20 in the radial direction transversely with respect to the longitudinal axis 12. The terms "inlet" and "outlet" relate in this connection to the direction of fluid flow through the air dryer cartridge 10 during the normal operation for drying and cleaning the fluid. In the regeneration mode, the flow passes in the reverse direction through the air dryer cartridge 10 and therefore the inlet and outlet openings 20, 24.

The central outlet opening 24 is bounded by a fastening stub 22 of the fastening flange 18. Said fastening stub 22 is provided with an inner thread.

The air dryer cartridge 10 can be mounted on a compressed air treatment device (not illustrated) which is part of a compressed air treatment system. The compressed air treatment device has a connecting stub which is provided with an outer thread, and therefore the air dryer cartridge 10 can be screwed with the fastening stub 22 of the fastening flange 18 onto the compressed air treatment device. The screw connection between the fastening stub 22 and the connecting stub forms a releasable, but fluidtight connection between the air dryer cartridge 10 and the compressed air treatment device. In the mounted state, the longitudinal axis 12 of the air dryer cartridge 10 and the longitudinal axis of the connecting stub of the compressed air treatment device are oriented coaxially with respect to each other.

As illustrated in FIG. 1, the air dryer cartridge 10 also has an inner housing 40 which consists of a first inner housing part 40a and a second inner housing part 40b and is preferably formed from a plastics material. The first inner housing part 40a of the inner housing 40 is arranged in the radial direction transversely with respect to the longitudinal axis 12 outside the second inner housing part 40b of the inner housing 40. The cartridge housing 14, the fastening flange 18 and the inner housing 40 form a receiving space between them for a drying agent 60 (e.g. silica gel).

The first inner housing part 40a of the inner housing 40 is provided with a plurality of openings 42 on a substantially radially oriented wall portion, said openings being fluidically connected to the inlet opening 20 of the fastening flange 18. During the normal operation of the air dryer cartridge 10, the compressed air can thus flow out of the compressed air treatment device through the inlet opening 20 in the fastening flange 18 and the openings 42 of the inner housing 40 into the interior of the cartridge housing 14. A filter device 44 (e.g. coarse filter) is arranged in the flow path between the inlet opening 20 and the openings 42 in the first inner housing part 40a. The compressed air can be cleaned with said filter device 44 before it flows through the drying agent 60 in the cartridge housing 14 of the air dryer cartridge 10.

A bypass 48 is provided in the radial direction outside the filter device 44. A nonreturn valve 52 is arranged in said bypass 48 and, during the normal operation of the air dryer cartridge 10, prevents compressed air from flowing from the inlet opening 20 past the filter device 44 by means of the bypass 48 and into the drying agent 60 without being cleaned. However, in the regeneration mode of the air dryer cartridge 10, the nonreturn valve 52 permits an air flow past the filter device 44.

The inner housing 40 is preferably formed from a plastics material. The nonreturn valve 52 is preferably likewise formed from a plastics material. Use can optionally be made here of identical or different plastics materials for the inner housing 40 and the nonreturn valve 52. For example, an elastomer, optionally made from one or at least two different materials, can be used for the nonreturn valve 52.

According to the invention, the nonreturn valve 52 is formed integrally with the first inner housing part 40a of the inner housing 40. For example, the nonreturn valve is injection molded on the first inner housing part 40a or manufactured therewith in a two-component injection molding technique.

In the exemplary embodiment of FIG. 1, the nonreturn valve 52 is configured in the manner of a valve flap. The valve flap is formed substantially annularly about the longitudinal axis 12 of the air dryer cartridge 10. One end of the valve flap, in particular the inner end of the valve flap in the radial direction, is integrally formed on the first inner housing part 40a of the inner housing 40. The other free end of the valve flap is supported on an inner circumferential surface 53 of the cartridge housing 14, in particular on a portion of the inner circumferential surface 53, which portion runs substantially parallel to the longitudinal axis 12 of the air dryer cartridge 10. In this exemplary embodiment, the flow passes through the nonreturn valve 52 axially, i.e. in a direction substantially parallel to the longitudinal axis 12 of the air dryer cartridge 10, in the regeneration mode of the air dryer cartridge.

As illustrated in FIG. 1, a sealing lip 43 is additionally provided on the first inner housing part 40a of the inner housing 40 in the region of the openings 42, said sealing lip being elastically pretensioned against the inner circumferential surface 53 of the cartridge housing 14 and preferably being formed integrally with the first inner housing part 40a. In the region of the fastening stub 22, a sealing lip 54 is provided on the first inner housing part 40a, said sealing lip preferably being integrally formed with the latter and preferably being elastically pretensioned against the fastening flange 18 (or alternatively against the fastening stub 22).

The second inner housing part 40b of the inner housing 40 has openings 56 in the central region, connecting the inner space of the cartridge housing 14 to the outlet opening 24. A sealing lip 58 is provided on the radially outer circumferential edge of the second inner housing part 40b, said sealing lip preferably being formed integrally therewith and preferably being elastically pretensioned against the first inner housing part 40a of the inner housing 40.

The second inner housing part 40b of the inner housing 40 is movable in the cartridge housing 14 in the axial direction, i.e. parallel to or coaxially with respect to the longitudinal axis 12 of the air dryer cartridge 10. By means of a pretensioning element 62 in the form of a compression spring which is supported against the first inner housing part 40a, the second inner housing part 40b of the inner housing 40 is pressed in the direction of the housing cover 16 in order to compress the drying agent 60. By means of the sealing lip 58 on the second inner housing part 40b, the inner housing 40 remains fluidtight here between its two inner housing parts 40a, 40b.

As can be seen in FIG. 1, the second inner housing part 40b is configured in such a manner that some of the drying agent 60 is arranged in a space region in the radial direction within the pretensioning element 62. By means of this optimum use of space in the interior of the cartridge housing 14, the air dryer cartridge 10 can be configured to be smaller, i.e. with a smaller diameter and/or a lower height, with the same drying power.

In order, in the mounted state of the air dryer cartridge 10, to obtain a fluidtight seal between the compressed air treatment device and the air dryer cartridge 10 in the radial direction, a sealing ring 70, preferably a square sealing ring in the exemplary embodiment of FIG. 1, is arranged between said two elements.

The sealing ring 70 lies on one side against a sealing surface 80 of the air dryer cartridge 10 and on the other side against an opposite sealing surface of the compressed air treatment device. When the air dryer cartridge 10 is screwed to the compressed air treatment device, the sealing ring 70 is compressed and produces a fluidtight seal in relation to the two sealing surfaces.

The sealing surface 80 is provided on an end side of the air dryer cartridge 10, said end side facing away from the housing cover 16 of the cartridge housing 14. Said sealing surface runs substantially flat in a plane substantially perpendicular to the longitudinal axis 12 of the air dryer cartridge 10. In the exemplary embodiment of FIG. 1, the sealing surface 80 is formed by the flange outer surface of the fastening flange 18.

In order to support the position of the sealing ring 70 outwards in the event of a compressed air load in the radial direction, the support ring 76 is designed in such a manner that it has a contact surface on its inner side for the sealing ring 70.

Figure 2:
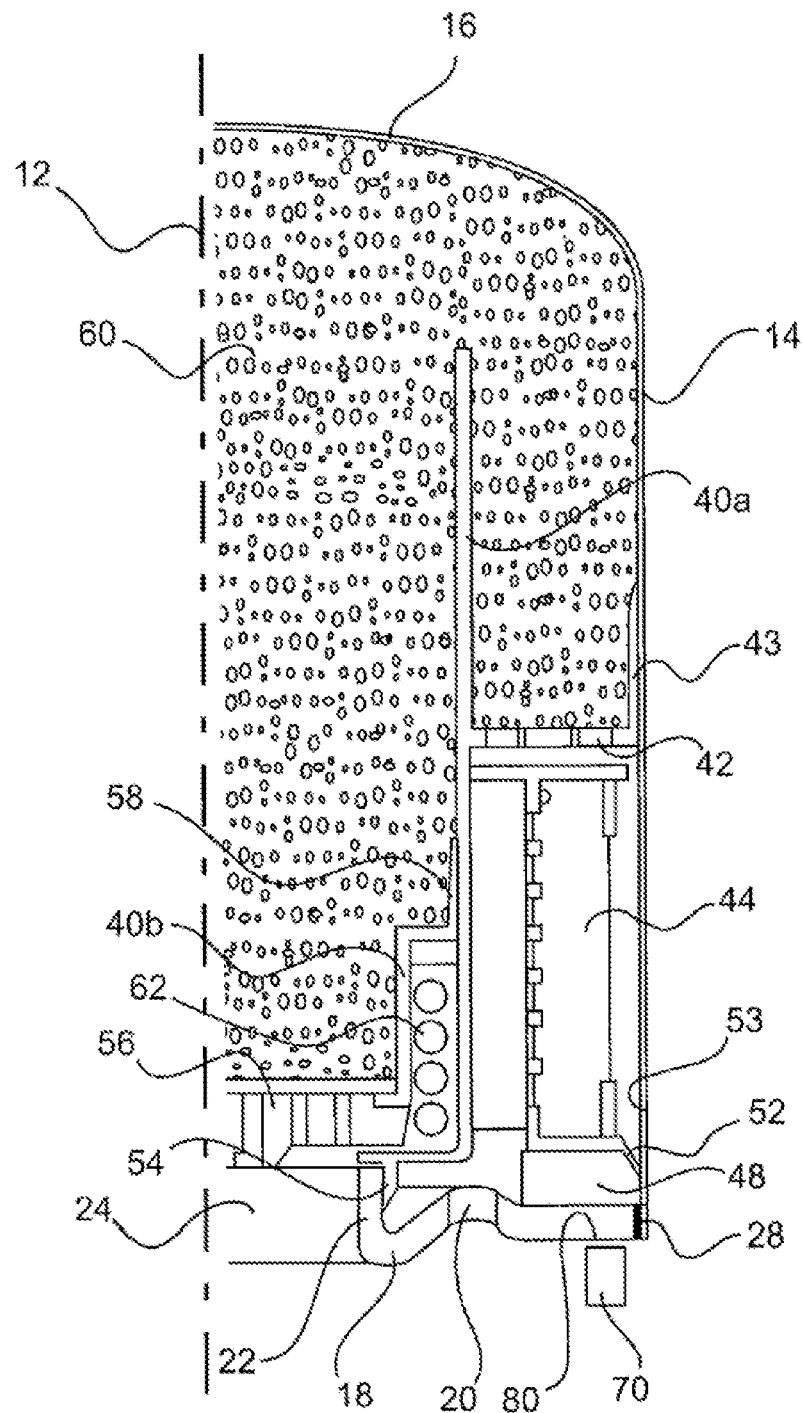
FIG. 2 is a partial sectional view of an air dryer cartridge according to a second exemplary embodiment of the invention.

FIG. 2 shows the design of an air dryer cartridge according to a second exemplary embodiment. Identical components and parts are identified here with the same reference signs as in the first exemplary embodiment. The second exemplary embodiment differs from the above-described first exemplary embodiment in particular by means of the arrangement of the filter device.

As illustrated in FIG. 2, in this exemplary embodiment the filter device 44 is configured as a coalescence filter or oil filter and is oriented substantially coaxially with respect to the longitudinal axis 12 of the air dryer cartridge 10. The filter device 44 can be plugged or wound, for example, onto the inner housing 40. In this embodiment, compressed air flows through the filter device 44 in a direction transversely with respect to the longitudinal axis 12 of the air dryer cartridge 10, i.e. radially.

The bypass 48 and the nonreturn valve 52 are substantially arranged below the filter device 44. The nonreturn valve 52 is formed integrally with a portion of the first inner housing part 40a of the inner housing 40, said portion holding the filter device 44.

Analogously to the first exemplary embodiment, the nonreturn valve 52 has a valve flap which is formed substantially annularly about the longitudinal axis 12 of the air dryer cartridge 10. One end of the valve flap, in particular the inner end of the valve flap in the radial direction, is integrally formed on the first inner housing part 40a of the inner housing 40. The other free end of the valve flap is supported on an inner circumferential surface 53 of the cartridge housing 14, in particular on a portion of the inner circumferential surface 53 that runs substantially parallel to the longitudinal axis 12 of the air dryer cartridge 10. Also in this exemplary embodiment, the flow passes axially through the nonreturn valve 52 in the regeneration mode of the air dryer cartridge.

Furthermore, the air dryer cartridge 10 of this exemplary embodiment corresponds to that of the first exemplary embodiment.

The present invention is not restricted to the above-described exemplary embodiments of the compressed air treatment system. On the contrary, a person skilled in the art will identify numerous variants and modifications which fall within the scope of protection of the claims.

While the inner housing 40 in the exemplary embodiments described is constructed in each case from a first inner housing part 40*a* and a second inner housing part 40*b*, the inner housing 40 in other exemplary embodiments may also be of integral design or assembled from more than two housing parts.

LIST OF REFERENCE SIGNS

10 Air dryer cartridge
12 Longitudinal axis
14 Cartridge housing
16 Housing cover
18 Fastening flange
20 Inlet opening
22 Fastening stub
24 Outlet opening
28 Connection
40 Inner housing
40*a* First inner housing part
40*b* Second inner housing part
42 Openings
43 Sealing lip
44 Filter device
48 Bypass
52 Nonreturn valve
53 Inner circumferential surface
54 Sealing lip
56 Openings
58 Sealing lip
60 Drying agent
62 Pretensioning element
70 Sealing ring
76 Support ring
80 Sealing surface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air dryer cartridge for a compressed air treatment system of a commercial vehicle, comprising:
   a cartridge housing with a closed housing cover;
   an inner housing arranged in the cartridge housing;
   a drying agent which is accommodated in an intermediate space between the cartridge housing and the inner housing;
   a filter device which is arranged within the cartridge housing and is positioned upstream of the drying agent in a normal compressed air flow direction, based on a normal operation of the air dryer cartridge;
   a bypass for bypassing the filter device; and
   a nonreturn valve which is arranged in the bypass, blocks compressed air flow in the normal direction of the drying agent and permits a compressed air flow in a direction from the drying agent opposite the normal compressed air flow direction, wherein
   the nonreturn valve is formed integrally with the inner housing.

2. The air dryer cartridge as claimed in claim 1, wherein the inner housing is manufactured from a plastics material and the nonreturn valve is manufactured from a plastics material.

3. The air dryer cartridge as claimed in claim 2, wherein the nonreturn valve has a valve flap which is integrally formed on the inner housing.

4. The air dryer cartridge as claimed in claim 1, wherein the nonreturn valve has a valve flap which is integrally formed on the inner housing.

5. The air dryer cartridge as claimed in claim 1, wherein compressed air is flowable through the nonreturn valve in a direction substantially parallel to a longitudinal axis of the air dryer cartridge.

6. The air dryer cartridge as claimed in claim 5, wherein the nonreturn valve has a valve flap with a free end, and the free end of the valve flap is supported on an inner circumferential surface of the cartridge housing.

7. The air dryer cartridge as claimed in claim 6, wherein the free end of the valve flap is supported on a portion of the inner circumferential surface of the cartridge housing, which portion runs substantially parallel to the longitudinal axis of the air dryer cartridge.

8. The air dryer cartridge as claimed in claim 1, wherein compressed air is flowable through the nonreturn valve in a direction substantially transversely with respect to a longitudinal axis of the air dryer cartridge.

9. The air dryer cartridge as claimed in claim 8, wherein the nonreturn valve has a valve flap with a free end, and the free end of the valve flap is supported on a flange inner surface of a fastening flange, said flange inner surface facing the inner housing.

10. The air dryer cartridge as claimed in claim 1, wherein a fastening flange is provided for closing an open end side of the cartridge housing, said end side facing away from the housing cover, and for fastening the air dryer cartridge to a compressed air treatment device; and
    the inner housing is sealed off from the fastening flange via a sealing lip, wherein the sealing lip is manufactured from a plastics material.

11. A compressed air treatment system for commercial vehicles, comprising at least one air dryer cartridge as claimed in claim 1.

* * * * *